(12) United States Patent
Nomura

(10) Patent No.: US 11,397,251 B2
(45) Date of Patent: Jul. 26, 2022

(54) DISTANCE MEASURING DEVICE

(71) Applicant: Konica Minolta, Inc., Tokyo (JP)

(72) Inventor: Shunsuke Nomura, Kodaira (JP)

(73) Assignee: Konica Minolta, Inc., Tokyo (JP)

( * ) Notice: Subject to any disclaimer, the term of this patent is extended or adjusted under 35 U.S.C. 154(b) by 692 days.

(21) Appl. No.: 16/309,030

(22) PCT Filed: Jun. 20, 2017

(86) PCT No.: PCT/JP2017/022603
§ 371 (c)(1),
(2) Date: Dec. 11, 2018

(87) PCT Pub. No.: WO2017/221909
PCT Pub. Date: Dec. 28, 2017

(65) Prior Publication Data
US 2019/0178996 A1    Jun. 13, 2019

(30) Foreign Application Priority Data
Jun. 21, 2016 (JP) .............................. JP2016-122227

(51) Int. Cl.
*G01S 7/487* (2006.01)
*G01S 17/10* (2020.01)
(Continued)

(52) U.S. Cl.
CPC ............ *G01S 7/4873* (2013.01); *G01S 7/487* (2013.01); *G01S 7/4865* (2013.01); *G01S 7/497* (2013.01);
(Continued)

(58) Field of Classification Search
None
See application file for complete search history.

(56) References Cited

U.S. PATENT DOCUMENTS

| 6,483,121 B1 * | 11/2002 | Ohishi | ..................... G01C 3/08 250/214 R |
| 2004/0070748 A1 * | 4/2004 | Inaba | ..................... G01S 17/10 356/5.01 |

FOREIGN PATENT DOCUMENTS

| EP | 0773453 | 5/1997 |
| JP | 09-236661 A | 9/1997 |

(Continued)

OTHER PUBLICATIONS

European Search Report issued in corresponding EP Application No. 17815377.1, dated May 21, 2019.
(Continued)

*Primary Examiner* — Eric L Bolda
(74) *Attorney, Agent, or Firm* — BakerHostetler

(57) ABSTRACT

A distance measuring device includes the following, an emitting unit; a receiving unit; a received signal detector; and a signal processor. The signal processor controls emitting of the signal by the emitting unit and starts counting time, calculates received timing when the receiving unit receives the signal based on the digital signal output by the received signal detector, and calculates a distance to the object based on transmitting time of the signal. As for a distance, etc., the signal processor considers the distance. Etc. to be a valid value when a condition that the calculated distance, etc. is no longer than a predetermined reference distance, etc. is satisfied, and when the condition is not satisfied, the signal processor considers the distance, etc. to be an invalid value.

10 Claims, 6 Drawing Sheets

(51) Int. Cl.
  *G01S 7/497* (2006.01)
  *G01S 7/4865* (2020.01)
  *G01S 17/931* (2020.01)

(52) U.S. Cl.
  CPC ............ *G01S 17/10* (2013.01); *G01S 17/931* (2020.01); *G01S 2007/4975* (2013.01)

(56) References Cited

FOREIGN PATENT DOCUMENTS

| | | | |
|---|---|---|---|
| JP | 2003-114277 A | | 4/2003 |
| JP | 2011-128112 A | | 6/2011 |
| JP | 2011128112 A | * | 6/2011 |
| JP | 2012-159330 | | 8/2012 |
| JP | 2013-033024 A | | 2/2013 |
| JP | 5439684 B2 | | 3/2014 |

OTHER PUBLICATIONS

International Preliminary Report on Patentability issued in parent PCT Application No. PCT/JP2017/022603, dated Dec. 25, 2018.
International Search Report issued in parent PCT Application No. PCT/JP2017/022603, dated Aug. 29, 2017.
European Patent Application No. 17815377.1; Office Action—Article 94(3); dated Oct. 7, 2021; 5 pages.

* cited by examiner

DISTANCE MEASURING DEVICE

This application is a 371 national stage application of PCT/JP2017/022603 filed Jun. 20, 2017, which claims priority to Japanese Application No. 2016-122227 filed Jun. 21, 2016, the entire disclosures of which are incorporated herein in their entireties.

TECHNOLOGICAL FIELD

The present invention relates to a distance measuring device which measures a distance to an object.

BACKGROUND ART

Recently, there is a strong demand to accurately detect obstacles from near to far within a range that a moving body moves for the purpose of preventing collisions of moving bodies such as vehicles or security robots.

There is also a demand to detect more various types of objects for the purpose of surveillance using a surveillance camera and the like.

As a detecting method of such object, there is a radio wave laser which emits a radio wave and detects a reflected wave. However, there is a problem that it is difficult to accurately detect an object in a far position from the viewpoint of resolution.

Alternatively, there is a laser radar employing a Time of Flight (TOF) method.

A TOF method measures the distance to an object by measuring transmitting time (Time of Flight) of a signal emitted by emitting a pulse of a laser beam hitting an object and then returning. As described in patent documents 1 and 2, according to the distance measuring device using the TOF method, the received timing when the emitted pulsed wave is reflected and returns is calculated based on a timing signal in which a received wave intersects with a threshold of a predetermined signal strength.

According to the invention described in patent documents 1 and 2, a plurality of thresholds with a height difference are used so that the distance measurement becomes highly accurate. When a plurality of thresholds with a height difference are detected, the received timing can be calculated based on various information. With this, the distance measurement becomes more accurate.

PRIOR ART DOCUMENT

Patent Document

Patent Document 1: Japanese Patent Application Laid-Open Publication No. H9-236661
Patent Document 2: Japanese Patent Application Laid-Open Publication No. 2013-33024

SUMMARY

Problems to be Solved by the Invention

However, the distance measuring device employing the TOF method detects a weak reflected light generated when the laser beam is irradiated to the object and the threshold is set to a low value to be able to detect the far object with a low brightness (low reflecting rate). Therefore, there is the problem of erroneous detection of internal noise in which internal noise due to scattered light from optical components such as a lens or a mirror in the apparatus or a mechanical component is detected. When the internal noise is erroneously detected as a signal, even if there is an object desired to be detected, the signal reflected from such object cannot be detected, and if there is no object, the measured distance value is output even if there is no object.

Further, when the term of receiving the signal reflected by the near object overlaps with the internal noise, the timing signal in which the rising received signal intersects with the threshold and the timing signal in which the falling received signal intersects with the threshold is obtained as a pair. However, a problem such as error in the measurement may occur due to the influence of the internal noise.

The present invention is conceived in view of the above problems, and a purpose of the present invention is to provide a distance measuring device which can accurately measure a distance to an object without the influence of noise.

Means for Solving the Problem

To achieve at least one of the above-mentioned objects, according to an aspect of the present invention, a distance measuring device reflecting one aspect of the present invention includes an emitting unit which emits a signal; a receiving unit which receives the signal emitted from the emitting unit and reflected on an object and which outputs a received signal according to received strength; a received signal detector which outputs a digital signal to discriminate whether the received signal output from the receiving unit exceeds a predetermined threshold of signal strength or not; and a signal processor which controls emitting of the signal by the emitting unit and starts counting time at an emitted timing of the signal, calculates received timing when the receiving unit receives the signal based on the digital signal output by the received signal detector, and calculates a distance to the object based on transmitting time of the signal from the emitting unit to the object and then to the receiving unit, the transmitting time obtained by ending the counting of time at the received timing, wherein, as for a distance, etc. which is a transmitting time or distance, the signal processor considers the distance, etc. to be a valid value when a condition that the calculated distance, etc. is longer than a predetermined reference distance, etc. is satisfied, and when the condition is not satisfied, the signal processor considers the distance, etc. to be an invalid value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

EMBODIMENT FOR CARRYING OUT THE INVENTION

Hereinafter, one or more embodiments of the present invention will be described with reference to the drawings. However, the scope of the invention is not limited to the disclosed embodiments.

An embodiment of the present invention is described with reference to the diagrams. The description below describes an embodiment of the present invention and is not intended to limit the present invention.

Figure 1:
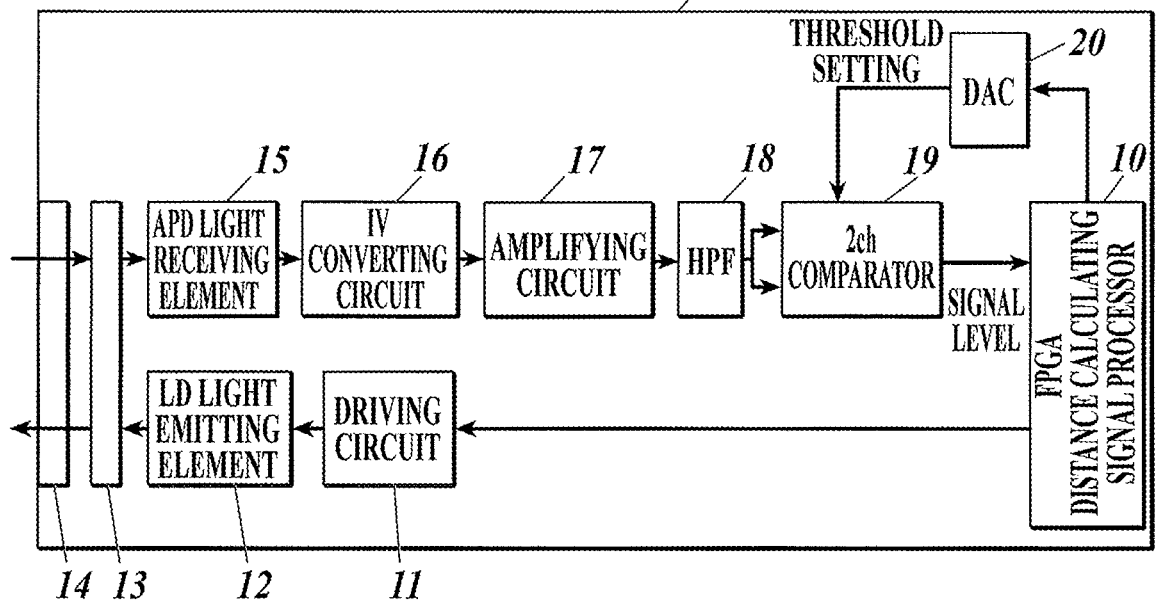
FIG. 1 is a block diagram showing a distance measuring device according to an embodiment of the present invention.
Figure 2:
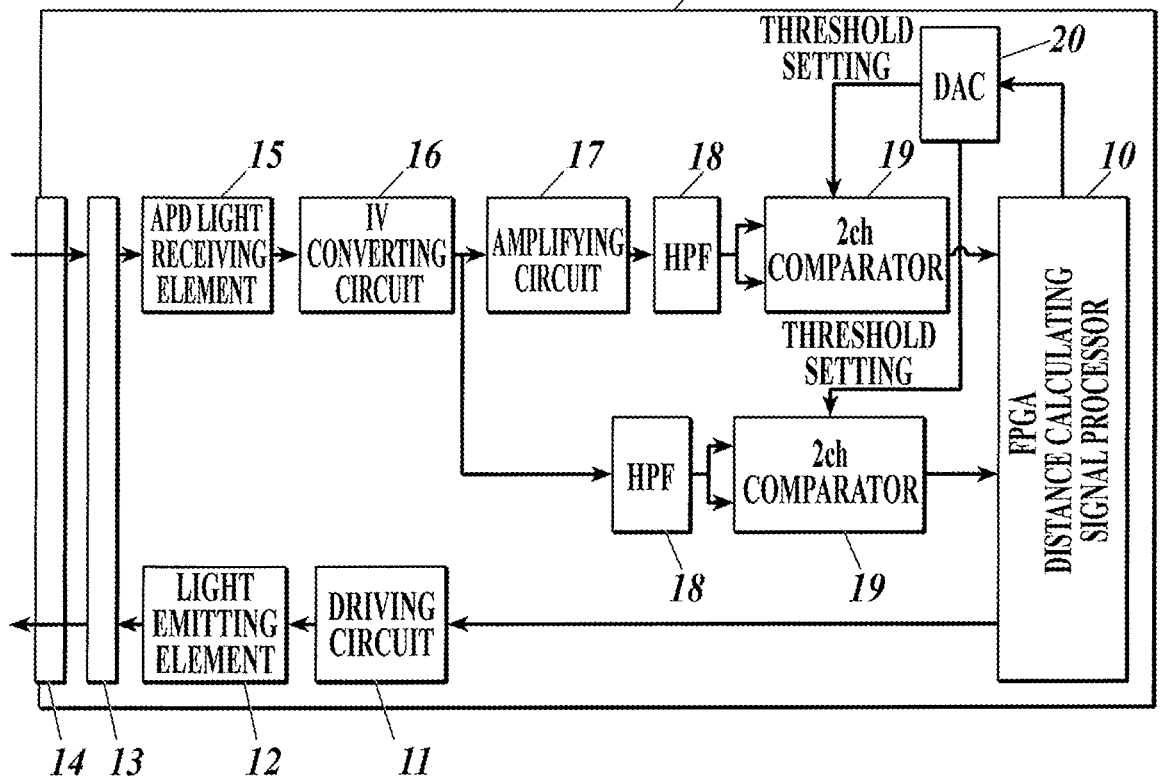
FIG. 2 is a block diagram showing a distance measuring device according to another embodiment of the present invention.

The distance measuring devices 1A and 1B according to the present embodiment include components as shown in FIG. 1 or FIG. 2. FIG. 1 is a block diagram showing a configuration including one comparator, and FIG. 2 is a block diagram showing a configuration including a plurality of comparators. The above are common with the exception of the number of comparators.

The distance measuring devices 1A and 1B according to the present embodiment shown in FIG. 1 or FIG. 2 include a signal processor 10, a driving circuit 11, a light emitting element 12, an optical component 13, a window material 14, a light receiving element 15, a IV converting circuit 16, an amplifying circuit 17, a high pass filter 18, a comparator 19, and a DA converter 20.

The light emitting element 12 is the main section of an emitting unit. According to the present embodiment, a laser diode is applied as the light emitting element 12. According to control by the signal processor 10, the driving circuit 11 applies a driving electric current to the light emitting element 12, and the light emitting element 12 performs pulse light emission and emits a signal. The signal emitted by the light emitting element 12 passes the optical component 13 such as a lens, or a scanning mirror, and the window material 14 to be emitted outside. A portion of the emitted laser beam becomes a scattered light at the optical component 13 and the window material 14 and is not emitted outside. This may enter the light receiving element 15 as internal noise.

The light receiving element 15 is the main portion of the receiving unit. An avalanche photodiode is applied as the light receiving element 15 according to the present embodiment.

The light receiving element 15 receives the signal emitted by the light emitting element 12 and reflected on the subject, and outputs the received signal depending on the received strength. The received signal output by the light receiving element 15 is converted to the voltage signal with the IV converting circuit 16, amplified by the amplifying circuit 17, passes the high pass filter 18 and is input in the comparator 19. The high pass filter 18 removes noise with a lower frequency than the frequency of the signal.

Figure 3A:
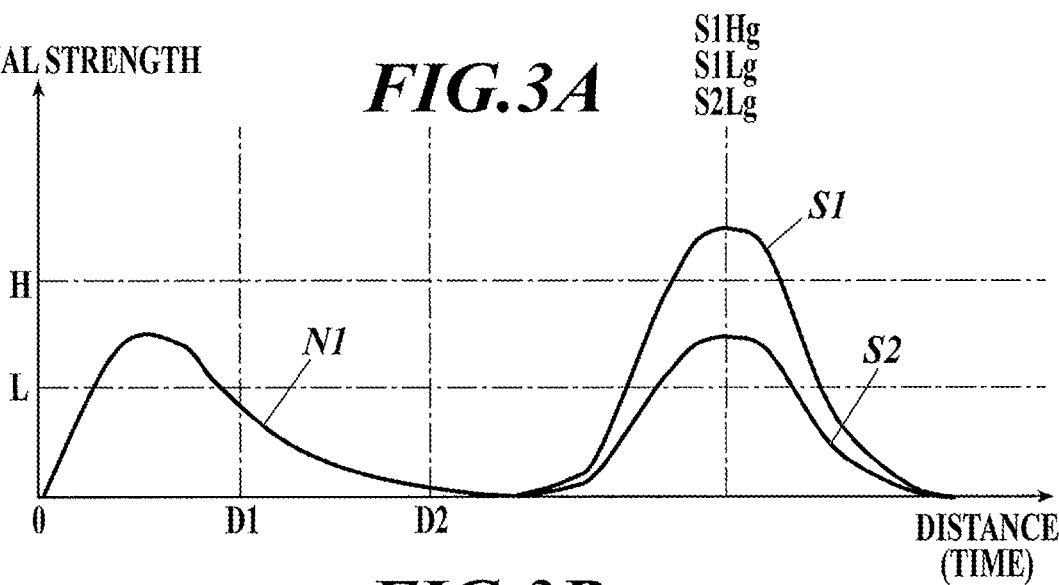
FIG. 3A is a waveform chart showing an example of a received signal received in the distance measuring device according to an embodiment of the present invention.
Figure 4A:
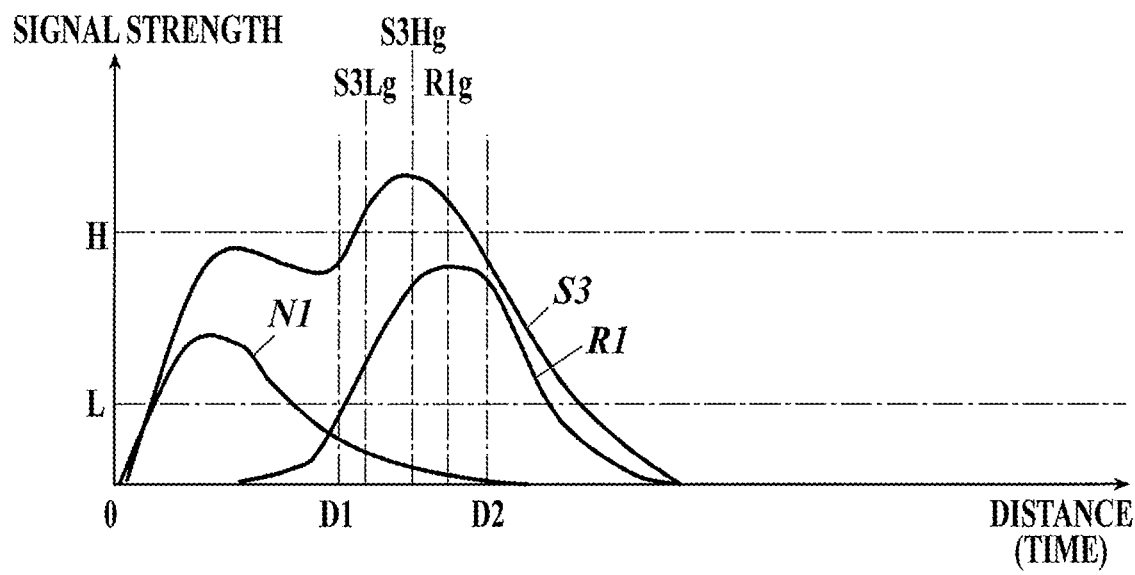
FIG. 4A is a waveform chart showing an example of a received signal received in the distance measuring device according to an embodiment of the present invention.

An example of the received signal is shown in FIG. 3A and FIG. 4A. Signal S1 is a received signal of a signal reflected by an object with a relatively high brightness. Signal S2 is a received signal of a signal reflected by an object with a relatively low brightness. Signal S3 is a received signal in which an ideal signal R1 of a signal reflected by an object in a relatively near distance and noise N1 which may be detected erroneously as a near object are combined. The noise N1 which may be detected erroneously as an object in a near distance is mostly due to internal noise by scattered light as described above.

Figure 3B:
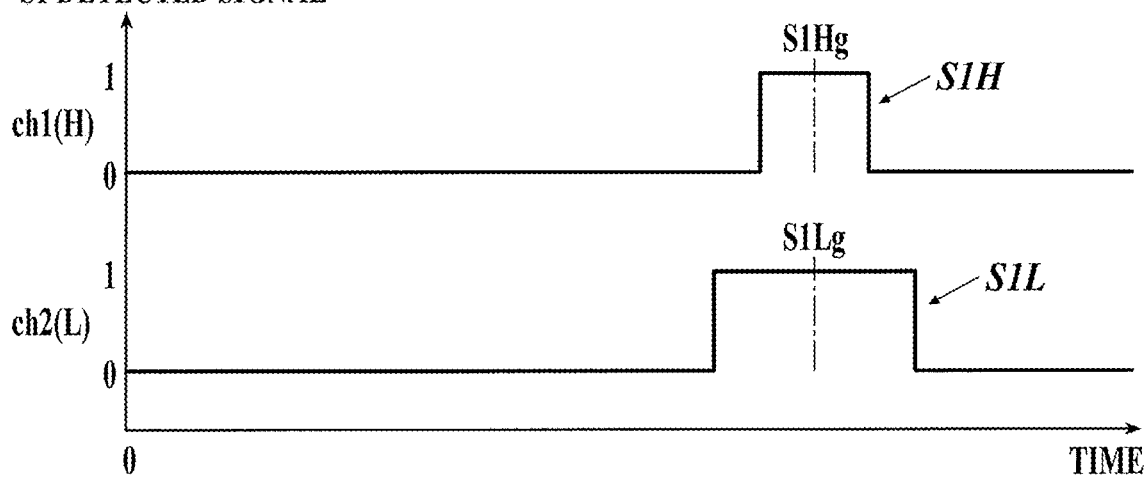
FIG. 3B is a waveform chart showing an example of a detected signal detected in the distance measuring device according to an embodiment of the present invention.
Figure 3C:
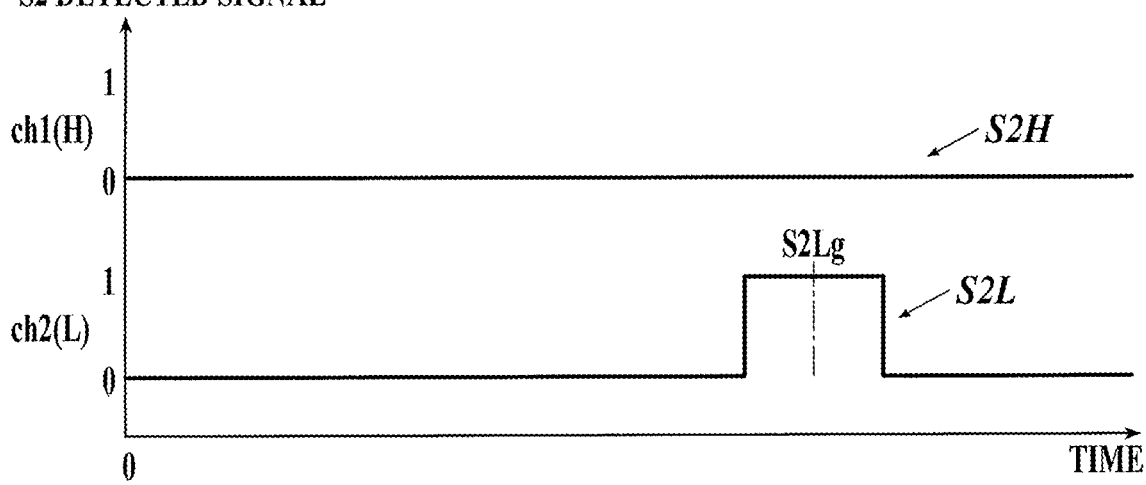
FIG. 3C is a waveform chart showing an example of a detected signal detected in the distance measuring device according to an embodiment of the present invention.
Figure 4B:
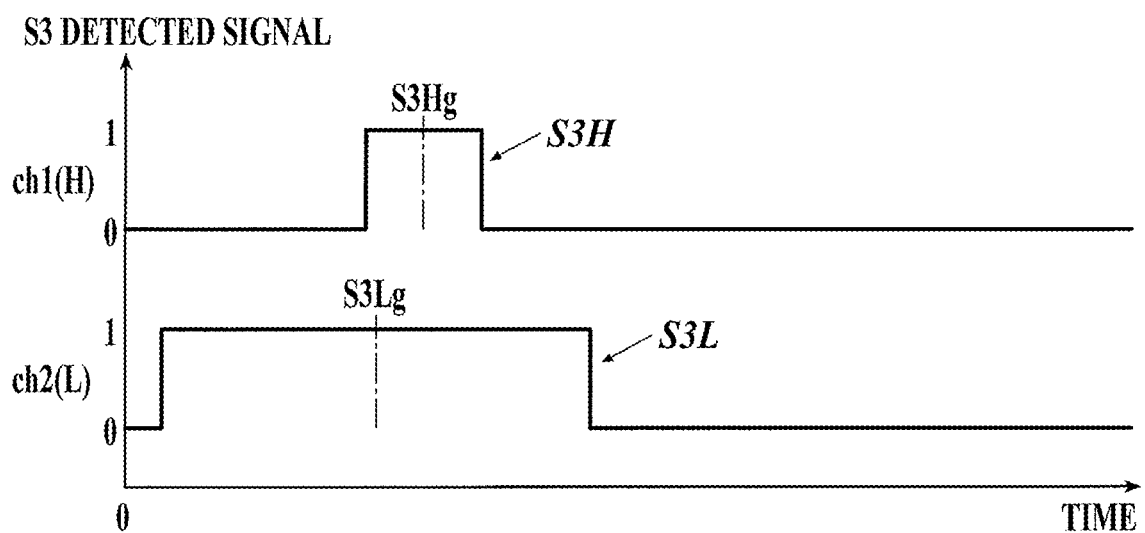
FIG. 4B is a waveform chart showing an example of a detected signal detected in the distance measuring device according to an embodiment of the present invention.

The comparator 19 composes the received signal detector. The comparator 19 includes two channels, and as shown in FIG. 3B, FIG. 3C, and FIG. 4B, a relatively high threshold H is set in one channel (code ch1), and a relatively low threshold L is set in the other channel (code ch2). The signal processor 10 can change the setting of the thresholds H, L through a DA comparator 20. The threshold L is set to a value to be a larger level than random sun light noise and power source noise or laser noise right after emitting light. For example, the value can be 500 mV. The threshold H is set to a value larger than the internal noise by the scattered light and the value higher than the threshold L. The noise N1 becomes high when there is dirt on the window material 14, and the threshold H is set so as to be able to detect the above. For example, the value can be 2500 mV.

As shown in FIG. 3B, FIG. 3C, and FIG. 4B, the ch1 of the comparator 19 outputs digital signals S1H, S2H, and S3H to discriminate whether the value is above the threshold H or not. As shown in FIG. 3B, FIG. 3C, and FIG. 4B, the ch2 of the comparator 19 outputs digital signals S1L, S2L, and S3L to discriminate whether the value exceeds the threshold L or not.

As the signal processor 10, an integrated circuit such as a FPGA (field-programmable gate array) is applied. The present embodiment employs a FPGA.

Figure 5:
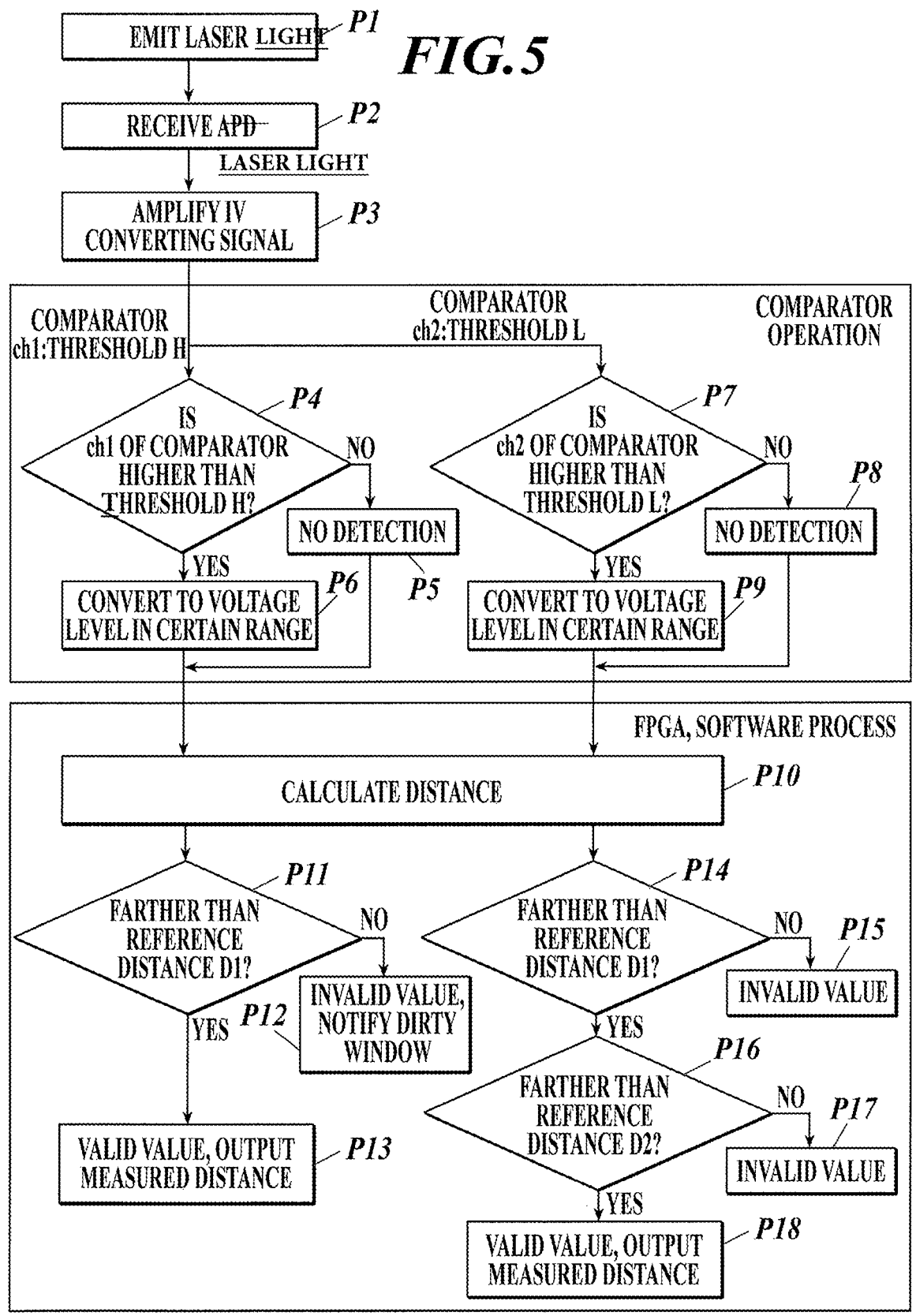
FIG. 5 is a flowchart showing a process in the distance measuring device according to an embodiment of the present invention.

The process performed in the distance measuring devices 1A, 1B according to the present embodiment is described below with reference to the flowchart shown in FIG. 5.

First, the signal processor 10 outputs the control signal to the driving circuit 11, controls the light emitting element 12 to emit the laser to emit a signal, and starts counting time setting the emitted timing of the signal as the standard (step P1). The signal emitted by the light emitting element 12 passes the optical component 13 such as the lens or the scanning mirror and the window material 14, and is emitted outside.

The light receiving element 15 receives the signal emitted by the light emitting element 12 and reflected by the object and outputs a received signal according to the received strength (step P2).

The received signal output by the light receiving element 15 is input to the comparator 19 through the IV converting circuit 16, amplifying circuit 17, and the high pass filter 18 (step P3).

When the input received signal does not exceed the threshold H (NO in step P4), the ch1 of the comparator 19 does not detect the signal (step P5, "0" in vertical axis of FIG. 3B, FIG. 3C, and FIG. 4B). When the input received signal exceeds the threshold H (YES in step P4), the signal is converted to a voltage level in a certain range (step P6, converted to level shown with "1" in vertical axis of FIG.

3B, FIG. 3C, and FIG. 4B) and the digital signal (S1H, S2H, S3H) according to the above is input in the signal processor 10.

When the input received signal does not exceed the threshold L (NO in step P7), the ch2 of the comparator 19 does not detect the signal (step P8, "0" in vertical axis of FIG. 3B, FIG. 3C, and FIG. 4B). When the input received signal exceeds the threshold L (YES in step P7), the signal is converted to a voltage level in a certain range (step P9, converted to level shown with "1" in vertical axis of FIG. 3B, FIG. 3C, and FIG. 4B) and the digital signal (S1L, S2L, S3L) according to the above is input in the signal processor 10.

The signal processor 10 executes the following process by executing a computer program.

In step P10, the signal processor 10 calculates the received timing that the light receiving element 15 received the signal on the basis of the digital signal (S1H, S2H, S3H) generated in the threshold H. The signal processor 10 calculates the distance to the object based on the transmitting time of the signal from the light emitting element 12 passing the object and reaching the light receiving element 15 obtained when the counting of the time setting the emitted timing as the standard ends. The received timing calculated based on the signal S1H is described as "S1Hg". Similarly, the received timing calculated based on the signal S2H is described as "S2Hg", and the received timing calculated based on the signal S3H is described as "S3Hg". In FIG. 3C, the signal S2H does not exceed the threshold H and therefore the received timing S2Hg does not exist.

In step P10, the signal processor 10 calculates the received timing that the light receiving element 15 received the signal on the basis of the digital signal (S1L, S2L, S3L) generated in the threshold L. The signal processor 10 calculates the distance to the object based on the transmitting time of the signal from the light emitting element 12 passing the object and reaching the light receiving element 15 obtained when the counting of the time setting the emitted timing as the standard ends. The received timing calculated based on the signal S1L is described as "S1Lg". Similarly, the received timing calculated based on the signal S2L is described as "S2Lg", and the received timing calculated based on the signal S3L is described as "S3Lg".

According to the present embodiment, step P10 uses the calculating method defining the received timing as a middle point (average value) between the timing that the rising received signal intersects with the threshold and the timing that the falling received signal intersects with the threshold.

In FIG. 3A-FIG. 3C, FIG. 4A, FIG. 4B, the origin "0" of the horizontal axis is the time counting start timing, and the time from the origin "0" to each received timing corresponds to the time consumed from when the counting started (emitting) to when the signal is received. This can be converted to the distance to the object which reflected the signal.

When the condition that the distance calculated based on the digital signals (S1H, S2H, S3H) generated by the threshold H is farther than the first reference distance D1 is satisfied (YES in step P11), the signal processor 10 determines this distance is a valid value (step P13). When such condition is not satisfied (NO in step P11), the signal processor 10 determines this distance is an invalid value (step P12). When NO in step P11, a window stain notification signal notifying the possibility that there is dirt on the window material 14 is output (step P12).

When the condition that the distance calculated based on the digital signals (S1L, S2L, S3L) generated by the threshold L is farther than the first reference distance D1 is satisfied (YES in step P14), the signal processor 10 advances the process to step P16.

When the condition that the distance calculated based on the digital signals (S1L, S2L, S3L) generated by the threshold L is farther than a second reference distance D2 is satisfied (YES in step P16), the signal processor 10 determines this distance is a valid value (step P18). When NO in step P14 and step P16, the distance is determined to be an invalid value (steps P15, P17). When the determining process reaches at least either one or both of step P13 and step P18, the measured distance is output based on the valid value as described below.

Here, the difference in the technical effect is described considering the number of thresholds set, whether a reference distance is employed, and the number of reference distances. The points are summarized in table 1.

TABLE 1

| | DETERMINATION REFERENCE | FAR DISTANCE, HIGH BRIGHTNESS | FAR DISTANCE, LOW BRIGHTNESS | CLOSE DISTANCE | WINDOW DIRT |
|---|---|---|---|---|---|
| COMPARATIVE EXAMPLE 1 | ONE THRESHOLD | ACCURACY POOR | UNMEASURABLE | UNMEASURABLE | UNMEASURABLE |
| COMPARATIVE EXAMPLE 2 | PLURALITY OF THRESHOLDS | MEASURABLE | UNMEASURABLE | UNMEASURABLE | UNMEASURABLE |
| PRESENT INVENTION EXAMPLE 1 | PLURALITY OF THRESHOLDS, ONE REFERENCE DISTANCE | MEASURABLE | MEASURABLE | UNMEASURABLE | MEASURABLE |
| PRESENT INVENTION EXAMPLE 2 | PLURALITY OF THRESHOLDS, PLURALITY OF REFERENCE DISTANCES | MEASURABLE | MEASURABLE | MEASURABLE | MEASURABLE |

Figure 6:
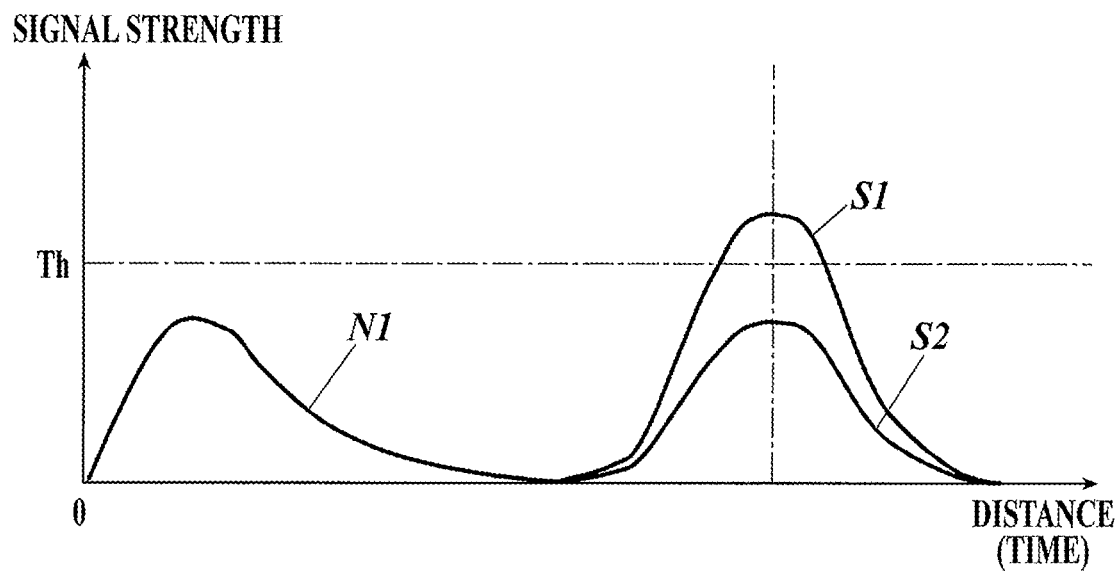
FIG. 6 is a waveform chart showing a received signal according to a comparative example.
Figure 7:
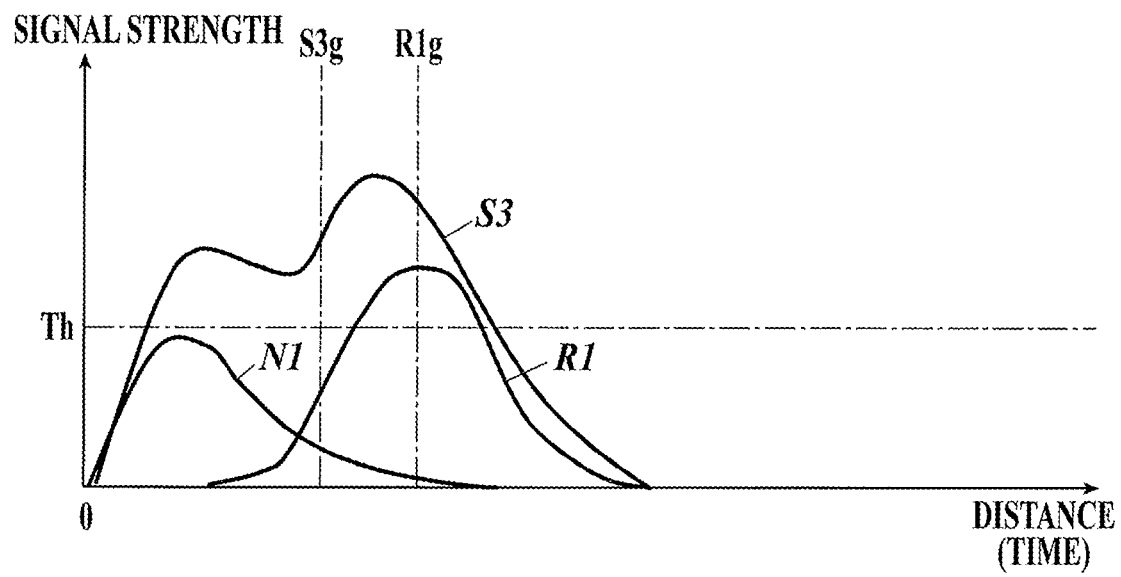
FIG. 7 is a waveform chart showing a received signal according to a comparative example.

First, the comparative example 1 shown in FIG. 6 and FIG. 7 is described.

The comparative example 1 sets one threshold and does not set the reference distance.

According to the comparative example 1 with such conditions, the threshold Th needs to be set higher than the noise N1 as shown in FIG. 6. Therefore, the signal S2 from the object which is far and which has a low brightness so that the signal strength becomes only about the same as the noise N1 is not detected. Consequently, the distance to such object cannot be measured. The signal S1 from the object which is far and which has a high brightness can be detected, and the distance to such object can be measured.

However, the received timing is calculated by a small amount of information based on one threshold Th. Therefore, the accuracy of the distance measurement is not good.

As shown in FIG. 7, the ideal signal R1, which is the signal reflected by the subject in a relatively short distance, continues as one with the noise N1, and actually the signal S3 is received. In this case, according to the comparative example 1, the received timing S3g based on the digital signal generated with the threshold Th becomes faster than the true received timing R1g of the ideal signal R1. With this, a disorder occurs in the distance measurement.

Further, the comparative example 1 does not have reference to determine the window stain.

The comparative example 2 is a configuration which sets a plurality of thresholds and which does not set the reference distance.

According to the comparative example 2 with such conditions, similar to the comparative example 1, the signal S2 from the object which is far and which has a low brightness so that the signal strength becomes only about the same as the noise N1 is not detected discriminated from the noise N1. As a result, the distance to such object cannot be measured.

According to the comparative example 2, the received timing for the object which is far and which has a high brightness can be calculated based on various information, and the distance measurement can be highly accurate.

According to the comparative example 2, there is a possibility that the received timing S3g which is close to the true received timing R1g can be calculated using the information based on the relatively high threshold. However, an error which is not permissible may occur due to the degree of overlapping and the relativity of the size of the ideal signal R1 and the noise N1. Moreover, it is difficult to clarify a standard to determine whether such error is permissible or not.

Further, the comparative example 2 does not have reference to determine the window stain.

The present invention example 1 is a configuration which sets a plurality of thresholds and sets one reference distance. This corresponds to the above-described configuration setting only the first reference distance D1. This also corresponds to the configuration which executes the process which omits steps P16 and P17 in the flowchart shown in FIG. 5, and connects YES in step P14 to step P18.

According to such present invention example 1, regarding the object which is far and which has a low brightness, the detected signal can be obtained with at least one relatively low threshold L, the noise N1 is discriminated with the first reference distance D1, and when the distance is farther than the first reference distance D1, the distance calculated with the threshold L is determined to be the valid value. Therefore, the distance can be measured. When the detected signal can be obtained by only one threshold, the distance based on the digital signal generated with this threshold (distance using the determination of step P14) is output as the measured distance.

According to the present invention example 1, regarding the object which is far and which has a high brightness, the received timing can be calculated based on various information, and the distance measurement becomes more accurate.

According to the present invention example 1, when the condition that the distance corresponding to the received timing S3Lg is farther than the first reference distance D1 is satisfied, this distance is to be the valid value. According to the present invention example 1, when the condition that the distance corresponding to the received timing S3Hg is farther than the first reference distance D1 is satisfied, the distance is to be the valid value. When the measured distance is calculated and output based on all valid values, when many errors are included in the distance corresponding to the received timing S3Lg, there is a possibility that an error which is not permissible may occur in the finally output measured distance. Moreover, it is difficult to clarify a standard to determine whether such error is permissible or not.

According to the present invention example 1, it is possible to determine the window stain (step P12).

The present invention example 2 is a configuration which sets a plurality of thresholds and a plurality of reference distances. This corresponds to the above-described configuration setting the first reference distance D1 and the second reference distance D2. This also corresponds to the configuration which executes the process according to the flowchart shown in FIG. 5.

According to such present invention example 2, regarding the object which is far and which has a low brightness, the detected signal can be obtained with at least one relatively low threshold L, the noise N1 is discriminated from the second reference distance D2, and when the distance is farther than the second reference distance D2, the distance calculated with the threshold L is determined to be the valid value. Therefore, the distance can be measured. When the detected signal can be obtained by only one threshold, the distance based on the digital signal generated by such threshold (distance used in determining steps P14, P16) is output as the measured distance.

According to the present invention example 2, regarding the object which is far and which has a high brightness, the received timing can be calculated based on various information, and the distance measurement becomes more accurate.

According to the present invention example 2, when the condition that the distance corresponding to the received timing S3Lg is farther than the second reference distance D2 is satisfied, this distance is to be the valid value. According to the present invention example 2, when the condition that the distance corresponding to the received timing S3Hg is farther than the first reference distance D1 is satisfied, this distance is to be the valid value. Even when the measured distance is calculated and output based on all of the valid values, as shown in FIG. 4A and FIG. 4B, the distance corresponding to the received timing S3Lg is determined to be an invalid value because the distance is not farther than the second reference distance D2 and the value does not influence the measured distance output as the final value, whereas the distance corresponding to the received timing S3Hg is considered to be the valid value. When the detected signal is obtained by only one threshold, the distance based on the digital signal generated by such threshold (distance used in determining step P11) is output as the measured distance.

According to the present invention example 1, it is possible to determine the unclean window (step P12).

According to the distance measuring devices 1A, 1B of the present embodiment, the distances calculated based on the digital signal generated by the thresholds are considered to be an invalid value at a distance up to the predetermined reference distance D1. Therefore, the influence of the noise N1 which may be erroneously detected as the object at a near distance can be avoided and the distance to the object can be measured with high accuracy. Since the predetermined near distance is determined to be invalid, near distance noise is not picked up even if the threshold is low. Therefore, it is possible to measure the distance to the object which is far and which has a low brightness with high accuracy using the low threshold.

According to the distance measuring devices 1A, 1B of the present embodiment provided with a plurality of thresholds to calculate the received timing, a farther reference distance is provided for a lower threshold. Therefore, the influence of the noise which may be erroneously detected as the near object can be avoided more accurately. Further, by suitably selecting or combining the plurality of thresholds, the distance to the object which is in a range from a near distance to a far distance and which has a high brightness to a low brightness can be measured with high accuracy.

Figure 8:
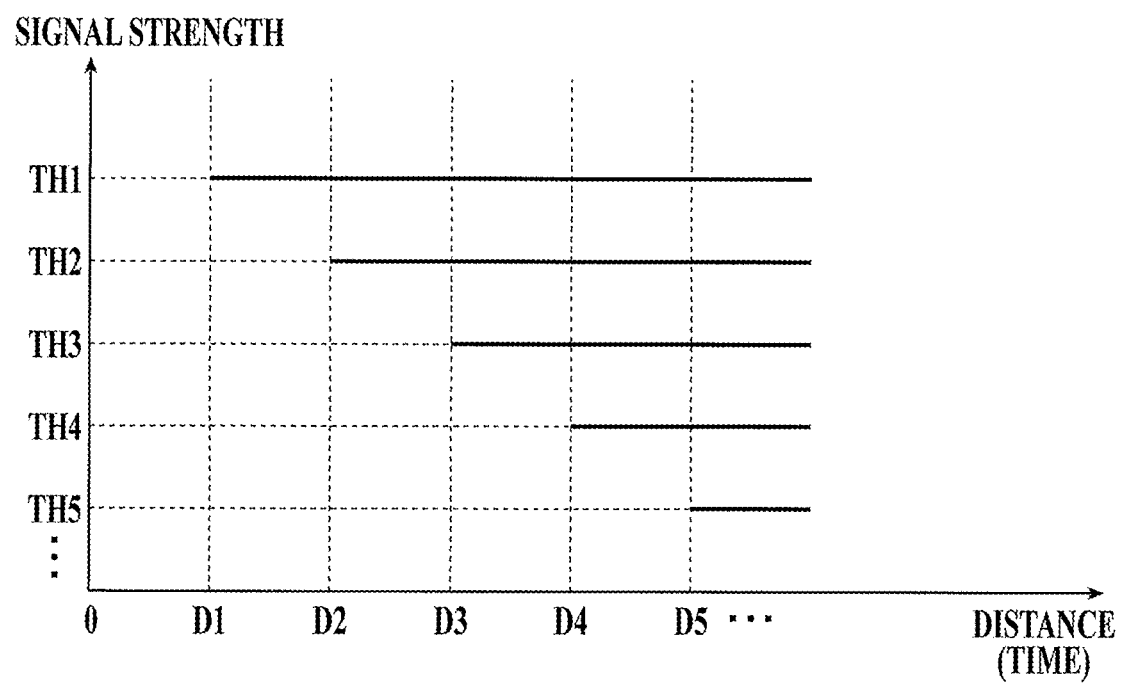
FIG. 8 is a chart showing a range with a solid line in which a distance is valid according to an embodiment of the present invention.

According to the present embodiment, for the ease of description, only two thresholds H, L and two reference distances D1, D2 are shown, but the thresholds and the reference distances can be increased to three or more, and the valid value and the invalid value can be determined with more steps to make a more accurate determination. In this case, as shown in FIG. 8, the process is performed as follows, when the distance is calculated based on the threshold Th1, the distance is determined to be valid when within the range of the solid line extending to the right of the reference distance D1, when the distance is calculated based on the threshold Th2, the distance is determined to be valid when within the range of the solid line extending to the right of the reference distance D2, when the distance is calculated based on the threshold Th3, the distance is determined to be valid when within the range of the solid line extending to the right of the reference distance D3, and so on (TH1>TH2>TH3>TH4>TH5 . . . , D1<D2<D3<D4< D5, . . . ). The distance measurement can be made more accurate by providing a plurality of thresholds with a common reference distance so that the obtained valid values increase. When a large number of thresholds are necessary, a plurality of comparators as described in the distance measuring device 1B shown in FIG. 2 can be provided to set different thresholds in each comparator.

When the plurality of valid values are obtained, the distance measurement can be made more accurate by selection such as selecting those of the highest threshold, combination such as combining the valid values by weighting, or selection of a plurality of the above and combination of the above. The method of calculation is not limited.

According to the above-described embodiment, after determination as the valid value or invalid value for the distance calculated based on the digital signal generated with the thresholds, the measured distance is calculated based on the distance as the valid value. Alternatively, after determination as the valid value or invalid value for transmitting time calculated based on the digital signal generated with the thresholds, the measured distance can be calculated based on the valid value of the transmitting time. That is, in calculating the final measured distance, the step converting the transmitting distance to the distance can be included at any point, and the point of time that this step is performed is not crucial to the essence of the present invention.

Although embodiments of the present invention have been described and illustrated in detail, the disclosed embodiments are made for purposes of illustration and example only and not limitation. The scope of the present invention should be interpreted by terms of the appended claims.

INDUSTRIAL APPLICABILITY

The present invention can be used in a distance measuring device.

DESCRIPTION OF REFERENCE NUMERALS 1A, 1B distance measuring device
10 signal processor
11 driving circuit
12 light emitting element
13 optical component
14 window material
15 light emitting element
16 IV converting circuit
17 amplifying circuit
18 high pass filter
19 comparator
20 DA converter
D1-D5 reference distance
H threshold
L threshold
N1 noise
R1 ideal signal
R1g received timing
S1 received signal
S2 received signal
S3 received signal
S1H, S2H, S3H digital signal (detected signal)
S1L, S2L, S3L digital signal (detected signal)
S1Hg received timing
S1Lg received timing
S2Lg received timing
S3Hg received timing
S3Lg received timing
Th threshold
S3g received timing

The invention claimed is:

1. A distance measuring device comprising:
an emitting unit which emits a signal;
a receiving unit which receives the signal emitted from the emitting unit and reflected on an object and which outputs a received signal according to received strength;
a received signal detector which outputs a digital signal to discriminate whether the received signal output from the receiving unit exceeds a predetermined threshold of signal strength or not; and
a signal processor which controls emitting of the signal by the emitting unit and starts counting time at an emitted timing of the signal, calculates received timing when the receiving unit receives the signal based on the digital signal output by the received signal detector, and calculates a distance to the object based on transmitting time of the signal from the emitting unit to the object and then to the receiving unit, the transmitting time obtained by ending the counting of time at the received timing, wherein,
the received signal detector comprises a first comparator associated with a first threshold and a second comparator associated with a second threshold, wherein the second threshold is less than the first threshold and the first threshold and the second threshold comprise voltage values corresponding to the received strength of the received signal,
the received signal is input to each of the first comparator and the second comparator, the received signal is converted to a digital signal by each of the first comparator and the second comparator in parallel based on the first threshold and the second threshold, and the digital signal output from each of the first comparator and the second comparator is input to the signal processor, and
the signal processor considers the transmitting time or the distance to be a valid value when a condition that the transmitting time or the distance is longer than a predetermined reference transmitting time or a predetermined reference distance is satisfied, and when the condition is not satisfied, the signal processor considers the transmitting time or the distance to be an invalid value.

2. The distance measuring device according to claim 1, wherein,
the signal processor outputs a window stain notification signal which notifies there is a possibility that dirt is attached to a window material on a transmitting path of the signal when the distance can be calculated based on the first threshold and the condition that the distance calculated based on the first threshold is longer than the predetermined reference distance is not satisfied.

3. The distance measuring device according to claim 1, wherein,
a plurality of reference distances including a first reference distance and a second reference distance which is shorter than the first reference distance are set in the signal processor,
the signal processor considers the distance to be a valid value when the condition that the distance calculated based on the second threshold is longer than the first reference distance is satisfied, and considers the distance to be an invalid value when the condition is not satisfied, and
the signal processor considers the distance to be a valid value when a condition that the distance calculated based on the first threshold is longer than the second reference distance is satisfied, and considers the distance to be an invalid value when the condition is not satisfied.

4. The distance measuring device according to claim 3, wherein when the distance can be calculated based on the first threshold, and a condition that the distance calculated based on the first threshold is longer than the second reference distance is not satisfied, the signal processor outputs a window stain notification signal which notifies there is a possibility that dirt is attached to a window material on a transmitting path of the signal.

5. The distance measuring device according to claim 1, wherein the signal processor can change a setting of at least one of the first threshold and the second threshold in the received signal detector.

6. The distance measuring device according to claim 1, wherein,
the signal processor outputs a window stain notification signal which notifies there is a possibility that dirt is attached to a window material on a transmitting path of the signal when the transmitting time can be calculated based on the first threshold and the condition that the transmitting time calculated based on the first threshold is longer than the predetermined reference transmitting time is not satisfied.

7. The distance measuring device according to claim 1, wherein,
a plurality of reference transmitting times including a first reference transmitting time and a second reference transmitting time which is shorter than the first reference transmitting time with a length difference are set in the signal processor,
the signal processor considers the transmitting time to be a valid value when the condition that the transmitting time calculated based on the second threshold is longer than the first reference transmitting time is satisfied, and considers the transmitting time to be an invalid value when the condition is not satisfied, and
the signal processor considers the transmitting time to be a valid value when a condition that the transmitting time calculated based on the first threshold is longer than the second reference transmitting time is satisfied, and considers the transmitting time to be an invalid value when the condition is not satisfied.

8. The distance measuring device according to claim 7, wherein when the transmitting time can be calculated based on the first threshold, and a condition that the transmitting time calculated based on the first threshold is longer than the second reference transmitting time is not satisfied, the signal processor outputs a window stain notification signal which notifies there is a possibility that dirt is attached to a window material on a transmitting path of the signal.

9. The distance measuring device according to claim 1, wherein the received signal detector comprises three or more comparators with different thresholds from each other, and three or more reference distances that are different from each other are set in the signal processor.

10. The distance measuring device according to claim 1, wherein the first threshold is higher than a voltage value corresponding to internal noise due to scattered light, and the second threshold is higher than a voltage value corresponding to random sun light noise, random power source noise, or post emission laser noise.

* * * * *